United States Patent
Domsik et al.

(10) Patent No.: US 11,271,449 B2
(45) Date of Patent: Mar. 8, 2022

(54) ELECTRIC MACHINE WITH A BRUSH-HOLDING COMPONENT AND A PLUG MODULE

(71) Applicant: Robert Bosch GmbH, Stuttgart (DE)

(72) Inventors: Istvan Domsik, Budapest (HU); Norbert Szucs, Elwood (AU); Pal Bodnar, Kistarcsa (HU); Peter Ungvari, Budapest (HU); Stephan Scheurich, Sinzheim (DE); Marc Ellerby, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 385 days.

(21) Appl. No.: 16/461,566

(22) PCT Filed: Nov. 15, 2017

(86) PCT No.: PCT/EP2017/079258
§ 371 (c)(1),
(2) Date: May 16, 2019

(87) PCT Pub. No.: WO2018/091493
PCT Pub. Date: May 24, 2018

(65) Prior Publication Data
US 2020/0067369 A1 Feb. 27, 2020

(30) Foreign Application Priority Data

Nov. 16, 2016 (DE) .................... 10 2016 222 532.4

(51) Int. Cl.
*H02K 5/14* (2006.01)
*H01R 13/405* (2006.01)
(Continued)

(52) U.S. Cl.
CPC ........... *H02K 5/148* (2013.01); *H01R 13/405* (2013.01); *H01R 39/38* (2013.01); *H02K 5/10* (2013.01);
(Continued)

(58) Field of Classification Search
CPC .......... H02K 5/148; H02K 5/10; H02K 5/225; H02K 7/116; H02K 11/026;
(Continued)

(56) References Cited

U.S. PATENT DOCUMENTS 4,314,692 A * 2/1982 Brauer .................. E05F 11/486
254/362
5,382,857 A 1/1995 Schellhorn et al.
(Continued)

FOREIGN PATENT DOCUMENTS

CN 101106303 A 1/2008
CN 101335472 A 12/2008
(Continued)

OTHER PUBLICATIONS

International Search Report for Application No. PCT/EP2017/079258 dated Feb. 16, 2018 (English Translation, 3 pages).

*Primary Examiner* — Ahmed Elnakib
(74) *Attorney, Agent, or Firm* — Michael Best & Friedrich LLP

(57) ABSTRACT

The invention relates to an electric machine (10) and system kits for electric machines (10), in particular for adjusting movable parts in a motor vehicle, comprising a commutator (55) which is arranged on a rotor shaft (20) and which can be connected to a power source in an electrically conductive manner by means of electric brushes (26), said brushes (26) being secured to a brush support component (17) which is directly radially supported on an inner wall (77) of a pole housing (12). The electric machine also of comprises a plug (Continued)

module (16) which has electric conductors (51) for connecting to an outer connection plug (18). The plug module (16) has axial protrusions (82) which engage into corresponding axial recesses (80) in the brush support component (17), wherein the axial protrusions (82) are likewise directly radially supported on the inner wall (77) of the pole housing (12) and not radially on the brush support component (17).

24 Claims, 5 Drawing Sheets

(51) Int. Cl.
| | | |
|---|---|---|
| *H01R 39/38* | (2006.01) | |
| *H02K 5/10* | (2006.01) | |
| *H02K 5/22* | (2006.01) | |
| *H02K 7/116* | (2006.01) | |
| *H02K 11/026* | (2016.01) | |

(52) U.S. Cl.
CPC ............. *H02K 5/225* (2013.01); *H02K 7/116* (2013.01); *H02K 11/026* (2013.01); *H02K 2213/12* (2013.01)

(58) Field of Classification Search
CPC ........... H02K 2213/12; H02K 2211/03; H02K 23/66; H02K 5/146; H02K 5/145; H02K 5/143; H02K 5/14; H01R 13/405; H01R 39/38; H01R 39/39; H01R 39/388; H01R 39/386; H01R 39/385

USPC .................................................. 310/239, 71
See application file for complete search history.

(56) References Cited

U.S. PATENT DOCUMENTS

| | | | |
|---|---|---|---|
| 5,693,993 A | * | 12/1997 | Ito .......................... H02K 23/66 |
| | | | 310/68 B |
| 8,657,033 B2 | | 2/2014 | Sengiku et al. |
| 2004/0201296 A1 | | 10/2004 | Hama et al. |
| 2004/0232784 A1 | | 11/2004 | Thomson et al. |
| 2007/0103013 A1 | | 5/2007 | Sakohira et al. |
| 2009/0001829 A1 | * | 1/2009 | Uchimura .............. H02K 5/148 |
| | | | 310/83 |
| 2011/0156545 A1 | | 6/2011 | Wen et al. |

FOREIGN PATENT DOCUMENTS

| | | |
|---|---|---|
| CN | 102025229 A | 4/2011 |
| CN | 102233543 A | 11/2011 |
| CN | 106026485 A | 10/2016 |
| DE | 4225496 | 2/1994 |
| DE | 102010062727 | 6/2012 |
| DE | 102013209233 | 11/2014 |
| EP | 618659 | 10/1994 |
| EP | 2375547 | 10/2011 |
| JP | 2014039381 A | 2/2014 |

\* cited by examiner

ELECTRIC MACHINE WITH A BRUSH-HOLDING COMPONENT AND A PLUG MODULE

BACKGROUND OF THE INVENTION

The present invention relates to an electrical machine having a brush holder component and a plug module, and also to a corresponding modular system.

DE 42 25 496 A1 has disclosed an electrical drive unit in which an intermediate frame, into which a brush holder is integrated, is arranged between a pole pot and a gear mechanism housing. In this case, the drive unit is of modular construction, wherein a separate plug is arranged at different positions on the drive unit. As a result, for example, different variants with or without an electronics housing can be realized and, depending on the installation position of the drive unit, the plug connection can be adjusted in accordance with space conditions and the customer-specific mating plug. One disadvantage of a design of this kind is that the intermediate frame comprising the brush holder has to be equipped with different electronics components depending on the application and a total of three separate components, specifically the intermediate frame, the plug and the electronics housing, are varied. In this case, modifying the design of the intermediate frame comprising the brush holder in particular is very complicated since the adjustment of the carbon brushes has a great influence on undesired development of noise during operation of the drive unit.

SUMMARY OF THE INVENTION

In contrast, the electrical machine according to the invention has the advantage that the brush carrier component can always be designed with the same construction for different machine variants, and as a result the brushes can always be positioned in the same way in relation to the commutator in the pole housing. The total variance for different applications of the electrical machine is found in the plug module which is designed firstly with different plug outputs and secondly with different electronics components in accordance with the desired customer requirement. Since the brush holder component is always centered radially in the pole housing independently of the plug module, an action of force on the connection plug does not have a direct influence on the positioning of the brushes, and therefore no undesired noises are produced in the process. In order that the plug module can likewise be centered directly on the pole housing, axial projections of the plug module extend into corresponding recesses in the brush holder component. As a result, the axial projections can be radially supported directly against the pole housing, without making contact with the brush holder component in the process.

Advantageous developments of and improvements to the embodiments specified in the independent claim are possible owing to the measures cited in the dependent claims. For example, the plug module advantageously has a base plate which axially closes off the pole housing, wherein only the rotor shaft protrudes out of the pole housing through a corresponding cutout in the base plate. As a result, the electronics components can be protected against swarf and carbon dust of the motor region. The connection plug is joined, for example, radially to the base plate, so that the mating plug can also be inserted into the connection plug radially entirely outside the pole housing.

The plug module can be produced in a particularly cost-effective manner from plastic, wherein the electrically conductive connection pins are designed as insert parts which establish an electrical connection to the brushes and possibly to other electronic components. In this case, the connection plug can be easily matched to the corresponding customer-specific mating plug, wherein the base plate can remain the same in respect of its basic structure. As a result, a plug module of this kind can be varied substantially more easily in terms of injection-molding than a brush holder component of relatively complex design.

In order to reduce the tolerance chain during assembly of the electrical machine, the plug module, by means of its axial projections which are integrally formed on the base plate, is centered directly on the inner side of the pole housing. Therefore, both the plug module and also the brush holder component have centering or positioning surfaces, which are in each case radially supported directly on the pole housing independently of one another, formed on their respective circumference.

In order that the electrical machines can be installed in relatively narrow spaces, such as a vehicle side door for example, the cross section of the pole housing can differ from a circle and have two flattened sides which, for example, are formed approximately parallel in relation to one another. Therefore, it is particularly expedient when both the plug module and also the brush holder component each have at least two centering surfaces which are supported against the opposite planar inner walls of the pole housing. In addition, two further axial projections are preferably formed on the plug module and are situated radially opposite one another and are radially supported against the inner walls of the pole housing which are in the form of a segment of a circle. Similarly, the brush holder component advantageously also has corresponding centering surfaces in the region of the circular inner walls of the pole housing.

For the purpose of mechanical end coupling of the plug module from the brush holder component, the cutouts in the brush holder component are larger than the corresponding axial projections of the plug module. In this way, it is possible to prevent the plug module from being radially supported directly against the brush holder component, as a result of which the positioning of the brushes in relation to the commutator is not adversely affected by undesired tilting or movement of the plug module.

An encircling edge is formed on the base plate of the plug module and axially bears firstly against the flange of the pole housing and, axially opposite, against a further housing, in particular a gear mechanism or electronics housing. For achieving a standardized interface between the pole housing and the respective gear mechanism housing, the encircling edge of the plug module can always be of standardized design for different variations of the plug module, so that identical connecting elements, for example screws, can also be used in each case.

A seal is particularly preferably formed on the encircling edge of the plug module, which seal seals off the entire housing of the electrical machine in a water-tight manner. In this case, the encircling edge is particularly expediently designed as a radial circumferential wall which at the same time is also part of the outer wall of the overall housing of the electrical machine.

Contact plugs can particularly advantageously be arranged radially inside the circumferential wall, which contact plugs extend axially away from the base plate toward the gear mechanism housing in order to make contact with corresponding mating contacts of an electronics system within the gear mechanism housing. As a result, the connection plug of an insert electronics system can also be electrically connected to the brush holder by means of the plug module.

An EMC shield which covers substantially the entire surface area of the plug module transversely in relation to the rotor shaft can optionally be arranged over the plug module. In this case, selectively only the region of the base plate and/or the region of the connection plug which is arranged radially outside the pole housing can be shielded. The entire motor—and in particular the region of the brushes—is surrounded by a Faraday cage owing to the contact-connection of the EMC shield to the pole housing.

In a further variant of the plug module, a centering dome which ensures a defined interface to the gear mechanism housing is formed around the central cutout of said plug module. Together with further adjusting surfaces on the outer edge of the plug module, both the radial and the tangential positioning of the gear mechanism housing in relation to the pole housing can be optimized.

For assembly of the electrical machine, the brush carrier component is axially inserted into the pole housing, before the plug module is then axially mounted onto the flange of the pole housing by means of the rotor shaft. In this case, the brush carrier component is axially pushed into the pole housing, wherein said brush carrier component is axially supported against correspondingly formed axial stops on the pole housing.

In this case, the brush carrier component is particularly advantageously axially arranged largely within the pole housing, so that the brush carrier component can be radially supported against the inner wall of the pole housing approximately over the entire axial extent of said brush carrier component. Tilting or tipping of the brush carrier component within the pole housing is prevented in this way. The brushes, which are arranged in a particularly space-saving manner here as hammer-type brushes radially inside the brush carrier component, are then optimally shielded by the circumferential wall of the pole housing in order to prevent emission of interference radiation from the electric motor.

After the plug module is mounted onto the pole housing, electrical conductor elements are electrically contact-connected to the plug module by the brush carrier component, and as a result electrically contact-connected to the connection pins of the connection plug. Here, for example, a connection wire of the brushes is particularly simply soldered or welded to corresponding contact elements of the plug module.

Owing to the arrangement of the connection plug radially outside the pole housing, the insertion direction and position of the corresponding customer-specific mating plug can be matched to the space conditions of the installation area in a particularly simple manner, without changing the basic design of the base plate or of the circumferential wall of the plug module. If the connection plug is angled in relation to the radial connecting web, the customer-specific mating plug can also be inserted in the axial direction, so that said mating plug extends axially along the pole housing. Owing to the design of a modular motor system with a brush carrier component which always remains the same, varying the electronic functions, such as rotor position detection or electronic interference suppression for example, can be shifted exclusively to the plug module which is easier to change. Owing to the pole housing interface which remains the same, good positioning of the brushes in a consistent and reliable manner in relation to the commutator can thereby be ensured and the electric motor can nevertheless be matched to a wide variety of customer requirements. In this case, the plug module can be fitted, for example, with different interference-suppression elements and can be designed with different rotary position sensors. Therefore, even in the case of different variants of the plug module, the pole housing/base plate of the plug module/gear mechanism housing interface can always remain the same, so that the flanges of the pole housing and of the gear mechanism housing are always reliably sealed off.

A particular advantage of the electrical machine is that the brush carrier component is electrically connected to the plug module, wherein electrical conductors are routed from the brushes to contact elements of the plug module - and are preferably soldered or welded to said contact elements after the plug module is axially mounted on that side which is situated axially opposite the brush holder component.

The base plate of the plug module runs approximately perpendicular in relation to the rotor shaft and bears in particular directly axially against the flange of the pole housing. The brush carrier component is, preferably by way of its circumferential wall which runs in the tangential direction, axially arranged completely within the pole housing.

The connection plug of the plug module can be formed with a plug collar, plug pins for a corresponding mating plug being arranged within said plug collar. In another module, the plug can be designed as contact lugs in the interior of the plug module, which contact lugs are contact-connected by means of corresponding clamping contacts—for example fork-type contacts or an insulation-displacement connection. In particular, the plug module always has a connection plug which is electrically contact-connected directly by a mating plug element being directly pushed on or inserted.

A step-down gear mechanism is advantageously mounted in the gear mechanism housing, which step-down gear mechanism passes on the drive torque from the electric motor to an output element which is designed, in particular, as an output pinion which protrudes out of the gear mechanism housing.

The gear mechanism is preferably designed as a worm gear mechanism in which a worm is arranged on the rotor shaft, which worm meshes with a worm gear in the gear mechanism housing. In this case, the rotor shaft with the worm protrudes axially through the base plate of the plug module into the gear mechanism housing.

BRIEF DESCRIPTION OF THE DRAWINGS

The invention is explained in more detail in the following description on the basis of exemplary embodiments which are illustrated in the drawings, in which.

DETAILED DESCRIPTION

Figure 1:
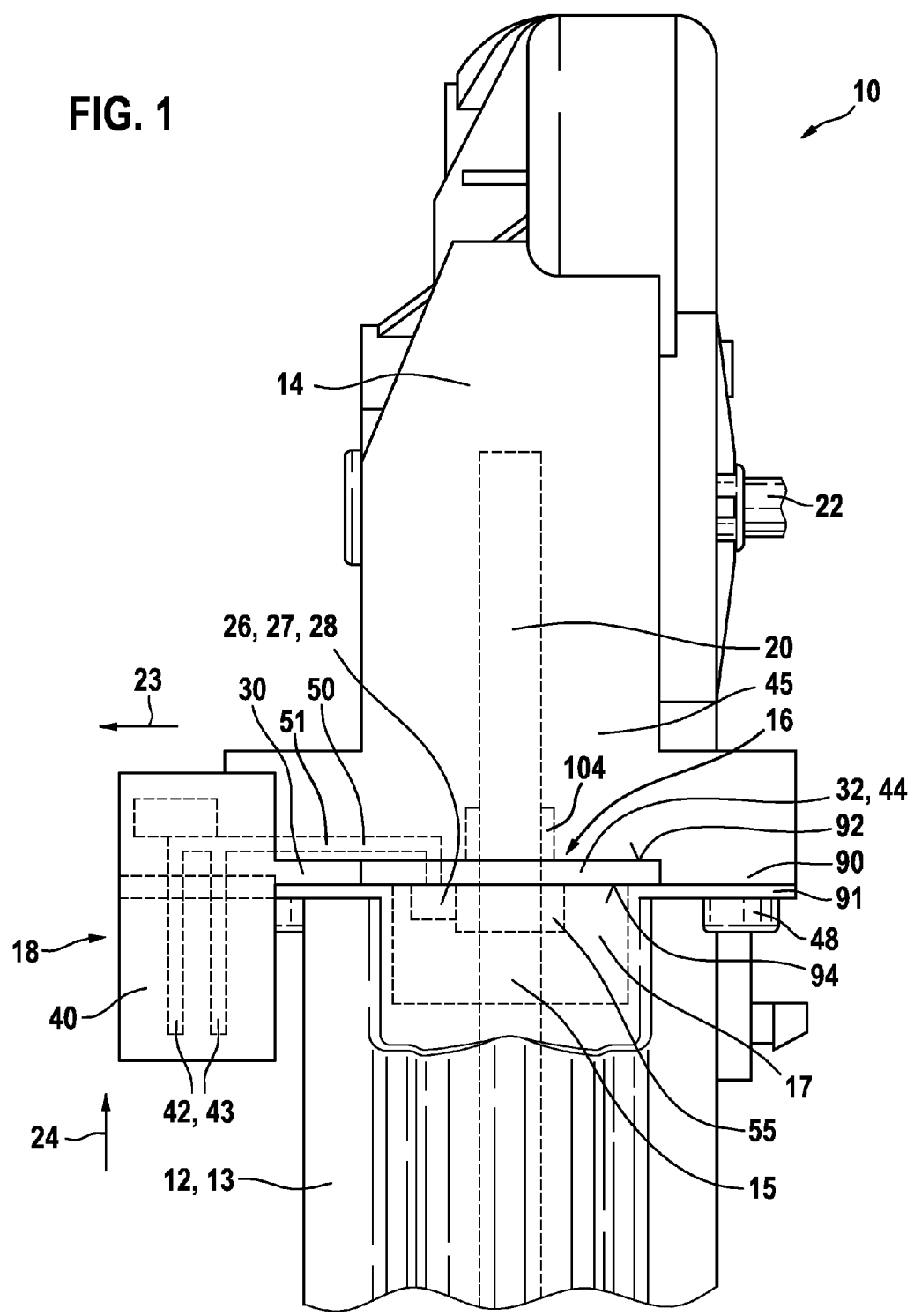
FIG. 1 shows an overview of an electrical machine according to a first exemplary embodiment.

FIG. 1 shows an electrical machine 10 as is used, for example, for adjusting moving parts—preferably window panes, sliding roofs or seat components—in a motor vehicle. In this case, a stator 13 is arranged in a pole housing 12, a rotor 15 being arranged within said stator and the rotor shaft 20 of said rotor extending axially from the pole housing 12 into an axially adjoining gear mechanism housing 14. In this case, the drive torque is transmitted from the rotor shaft 20 to a gear mechanism which is arranged in the gear mechanism housing 14, which gear mechanism has an output element 22 which interacts with a mechanism, not illustrated, which moves, for example, parts of a vehicle seat or a window pane in the motor vehicle. A plug module 16 is arranged between the pole housing 12 and the gear mechanism housing 14 in the axial direction 24, which plug module is electrically connected to brushes 26 of a separately manufactured brush carrier component 17 for the purpose of making electrical contact with a commutator 55 which is arranged on the rotor shaft 20. In this case, the brushes 26 can be designed as hammer-type brushes 27 or plug-type brushes 28. The plug module 16 has a connection plug 18 which is arranged radially outside the pole housing 12, and preferably also radially outside the gear mechanism housing 14, in the radial direction 23. In this case, the connection plug 18 is connected to the plug module 16 by means of a radial web 30. The brush carrier component 17 is produced separately from the plug module 16 and is arranged radially inside the pole housing 12. The plug module 16 has a base plate 32 which has a central cutout 34, the rotor shaft 20 extending through said central cutout in the axial direction 24 into the gear mechanism housing 14. The connection plug 18 has a plug collar 40, the connection pins 42 for making electrical contact with the electrical machine 10 being arranged within said plug collar. In the exemplary embodiment of FIG. 1, the plug collar 40 with the connection pins 42 extends in the axial direction 24, so that the corresponding plug can likewise be inserted into the plug collar 40 in the axial direction 24. It is clear from FIG. 1 that the plug module 16 is axially clamped between two flanges 94, 92 of the pole housing 12 and of the gear mechanism housing 14, wherein an outer circumferential edge 44 of the plug module 16 simultaneously forms part of the outer wall 45 of the electrical machine 10 in this exemplary embodiment. By way of example, the gear mechanism housing 14 is connected to the pole housing 12 by means of screws or other connecting elements 48, as a result of which the plug module 16 is firmly braced and fixed between the pole housing 12 and the gear mechanism housing 14. To this end, the connecting elements 48 pass through screw connection bosses 91 on the flange 94 of the pole housing 12 into corresponding mating receptacles 90 in the gear mechanism housing 14.

Figure 2:
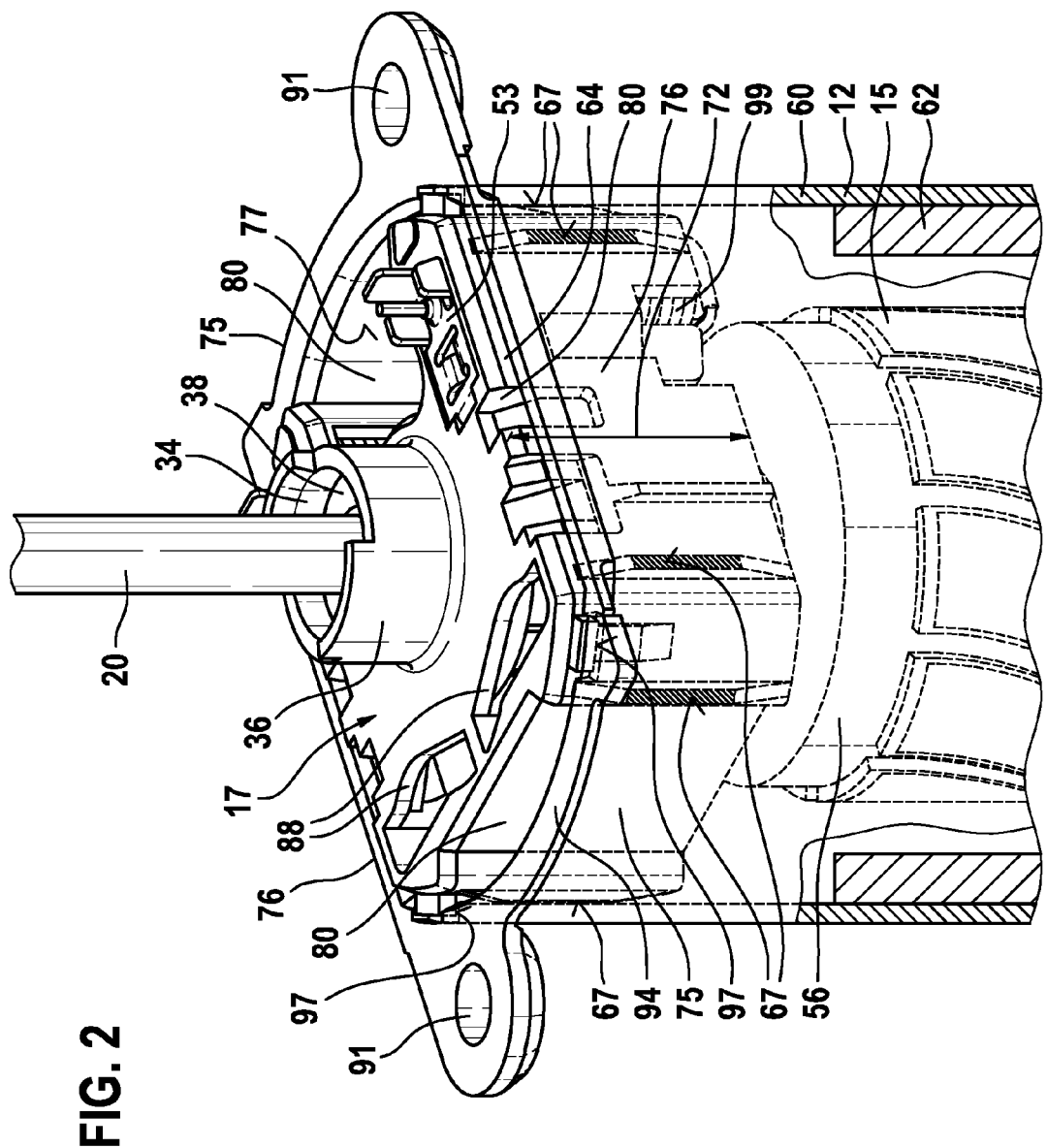
FIGS. 2 and 3 show a further exemplary embodiment of an electrical machine before and after mounting of the plug module.

FIG. 2 illustrates a further exemplary embodiment of an electrical machine 10 in which a brush carrier component 17 is joined to the rotor 15 in the pole housing 12. The brush carrier component 17 is largely inserted into the pole housing 12 in the axial direction 24, so that said brush carrier component terminates approximately axially with the flange 94 of the pole housing 12. In this case, the brush carrier component 17 is enclosed by the pole housing wall 60 over its entire circumference. The brushes 26, which bear radially against the commutator 55 which is fastened in a rotationally fixed manner on the rotor shaft 15, are arranged in the interior of the brush carrier component 17. The commutator 55 is connected to windings 56 of the rotor 15, so that the energized rotor 15 rotates in the magnetic field of the stator magnets 62. The brush carrier component 17 has positioning surfaces 67 on its outer circumference, which positioning surfaces radially center the brush carrier component 17 in the pole housing 12, as a result of which the brushes 26 are positioned exactly opposite the commutator 55. The positioning surfaces 67 bear radially directly against the inner side 77 of the pole housing wall 60. In this case, the positioning surfaces 67 extend over a significant portion of the axial extent 72 of the brush carrier component 17 in order to prevent tilting of said brush carrier component in the pole housing 12. In the exemplary embodiment, the pole housing 12 has a flattened circular cross section, so that the pole housing wall 60 has sections 75 in the form of a segment of a circle and two opposing parallel sections 76. The brush carrier component 17 bears by way of in each case at least one positioning surface 67—preferably by way of two positioning surfaces 67—against in each case one of said four sections 75, 76 of the pole housing wall 60. Owing to the positioning surfaces 67 being axially pressed in, the brush carrier component 17 is preferably axially fixed in the pole housing 12 at the same time as the radial centering operation by means of a force-fitting connection. In this case, axial stops 97 are formed on the pole housing 12, the brush carrier component 17 bearing axially against said axial stops. In this case, the axial stops 97 can be formed on the inner wall 77 or in the region of the flange 94. The brush carrier component 17 has axial cutouts 80 on the outer circumference 64, axial projections 82 which are integrally formed on the plug module 16 being axially inserted into said axial cutouts during mounting of said plug module. The axial cutouts 80 of the brush carrier component 17 are again in each case arranged on each of the four segments 75, 76 of the pole housing wall 60. By way of example, two radially opposite axial cutouts 80 extend over the entire axial extent 72 of the brush carrier component 17. However, two other radially opposite axial cutouts 80 extend only over a subregion of the axial extent 72. A central pipe stub 36 which receives a bearing 38 for the rotor shaft 20 is formed in the center of the brush holder component 17. By way of example, the bearing 38 of the rotor shaft 20 is pressed into the pipe stub 36. As a result, the commutator 55 is positioned on the rotor shaft 20 precisely in relation to the brushes 26.

Figure 3:
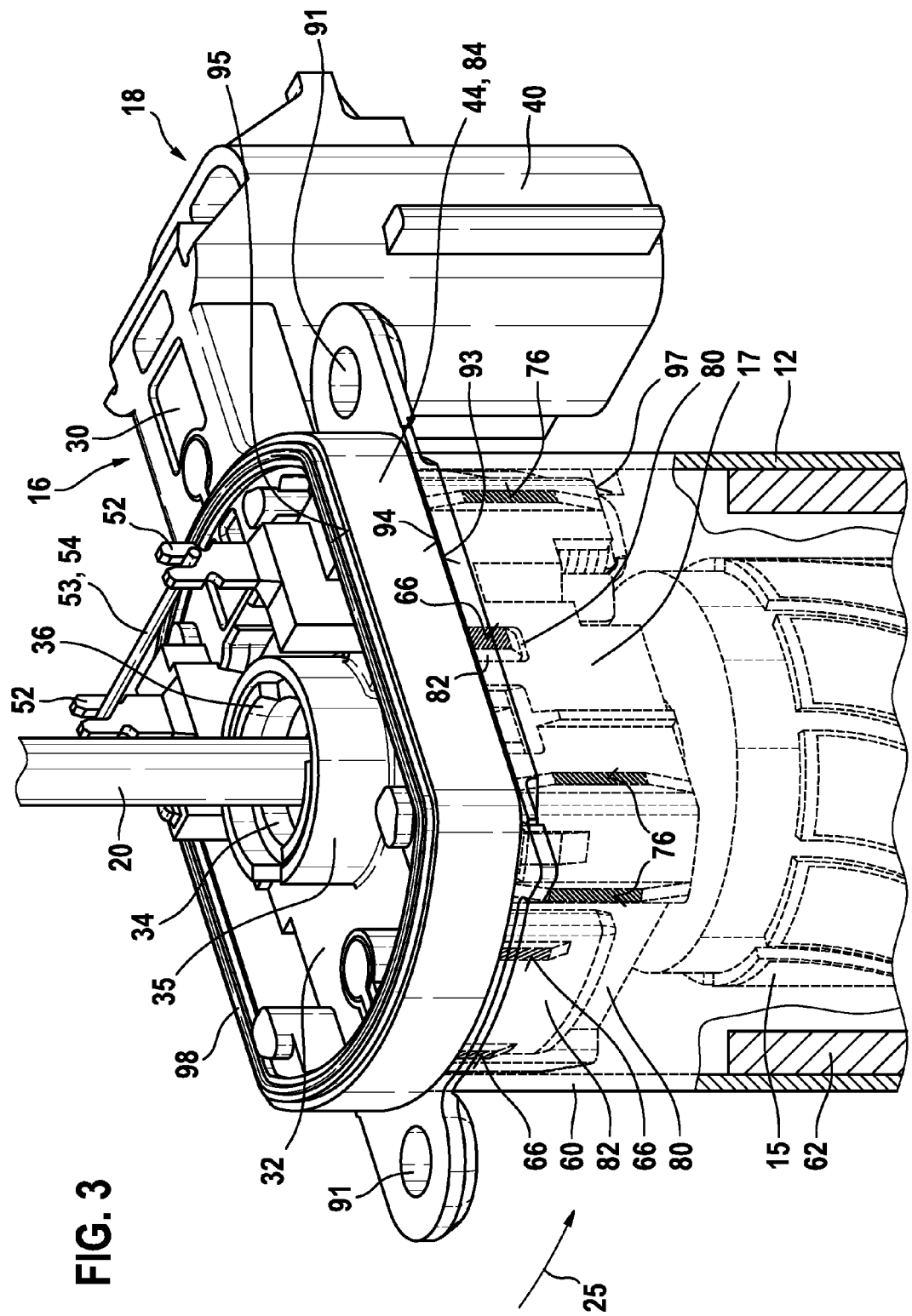

FIG. 3 illustrates how the plug module 16 is already axially mounted onto the pole housing 12. The plug module 16 has, on its base plate 32, the axial projections 82 which engage into corresponding axial cutouts 80 of the brush carrier component 17 and extend into the pole housing 12 in the axial direction 24. In this case, the axial projections 82 have, on their radial outer side, centering surfaces 66 by means of which the plug module 16 is centered in the pole housing 12 independently of the brush carrier component 17. In this case, the centering surfaces 66 are radially supported only against the inner side 77 of the pole housing wall 60, without being radially supported on the brush carrier component 17 in the process. In this case, the axial cutouts 80 of the brush carrier component 17 are preferably of a size such that the axial projections 82 of the plug module 16 inserted therein do not make contact with the axial cutouts 80 in the radial direction 23 and the tangential direction 25. In FIG. 3, two opposite axial projections 82 are designed in the form of an arc, so that they are supported against the corresponding circular segment 75 of the pole housing wall 60. In this case, in each case two centering surfaces 66, which are arranged in a manner separated from one another in the circumferential direction 25, are formed on the arcuate axial projections 82 in the exemplary embodiment. On the two opposite straight sides 76 of the pole housing wall 60, in each case one axial projection 82 with only one centering surface 66 is integrally formed on the plug module 16. The outer encircling edge 44 of the base plate 32 is designed as an encircling wall 84 which, by way of a first axial bearing surface 93, bears axially against the flange 94 of the pole housing 12. Opposite the flange 94, the encircling wall 84 has a second axial bearing surface 95 for the gear mechanism housing 14. After the plug module 16 is mounted, the gear mechanism housing 14, by way of the gear mechanism arranged on it, is placed axially against the axial bearing surface 95, and is connected to the flange 94 of the pole housing 12 by means of connecting elements 48, for example screws. In a preferred embodiment, axial seals 98 are arranged on the bearing surfaces 93, 95 in each case—in particular injection-molded onto the plug module 16—so that, after the pole housing 12 is axially braced with the gear mechanism housing 14, the plug module 16 is pressed in between these two housing parts 12, 14 and closed in a sealed manner. In this case, the rotor shaft 20 protrudes axially into the gear mechanism housing 14 in order to transmit the drive torque of the electric motor to the output element 22 by means of the gear mechanism. To this end, the rotor shaft 20 passes through the central cutout 34 in the base plate 32 of the plug module 16. The central cutout 34 is at least largely enclosed by a circular wall 35 of the plug module 16, the axial pipe stub 36 of the brush carrier component 17 axially engaging into said circular wall. The bearing body 38—in particular a sliding bearing—is arranged in the pipe stub 36, the rotor shaft 20 being received in said bearing body. Electrical conductors 51 of the connection pins 42 are routed radially into the pole housing 12 and connected to electrical contact elements 52, which are arranged radially inside the pole housing 12, by means of the radial web 30. In the exemplary embodiment, the connection pins 42, by way of their electrical conductors 51, are designed as stamped and bent parts 50 which, as insert parts, are encapsulated by the plug module 16 during production of said plug module. As an alternative, the stamped and bent parts 50 can also be inserted into the plastic housing of the plug module 16 after said plastic housing has been produced. For the purpose of electrical connection to the brushes 26 of the brush carrier component 17, electrical connections 53 are routed from said brush carrier component to the electrical contact elements 52 in the plug module 16 and are electrically connected to said electrical contact elements. To this end, for example, a connection wire 54 of the brushes 26 is welded or soldered to the electrical contact elements 52. In FIG. 3, the electrical contact elements 52, as fork-type contacts, protrude axially from the base plate 32 toward the gear mechanism housing 14, so that the weld or solder connection to the electrical contact elements 52 can be readily formed after the plug module 16 has been mounted onto the pole housing 12. Furthermore, sensor pins 43 are arranged in the connection plug 18, which sensor pins are connected to a magnet sensor 46 in the plug module 16 by means of the radial web 30. The magnet sensor 46 can detect the rotor position of the rotor 15 by interaction with a ring magnet 47 on the rotor shaft 20. Screw connection bosses 91 are formed on the flange 94 of the pole housing 12, it being possible for the connecting means 48 to be connected to corresponding mating receptacles 90 of the gear mechanism housing 14 through said screw connection bosses. In the simplest case, the connecting elements 48 are designed as screws which engage into corresponding threads in the mating receptacles 90. In this case, an EMC shield 86, which largely covers the plug module 16 transversely in relation to the axial direction 24, can be arranged between the plug module 16 and the gear mechanism housing 14. As a result, emission of interference radiation from the region of the brushes 26 can be effectively suppressed (EMC shield 86 is not illustrated in FIG. 3).

Figure 4:
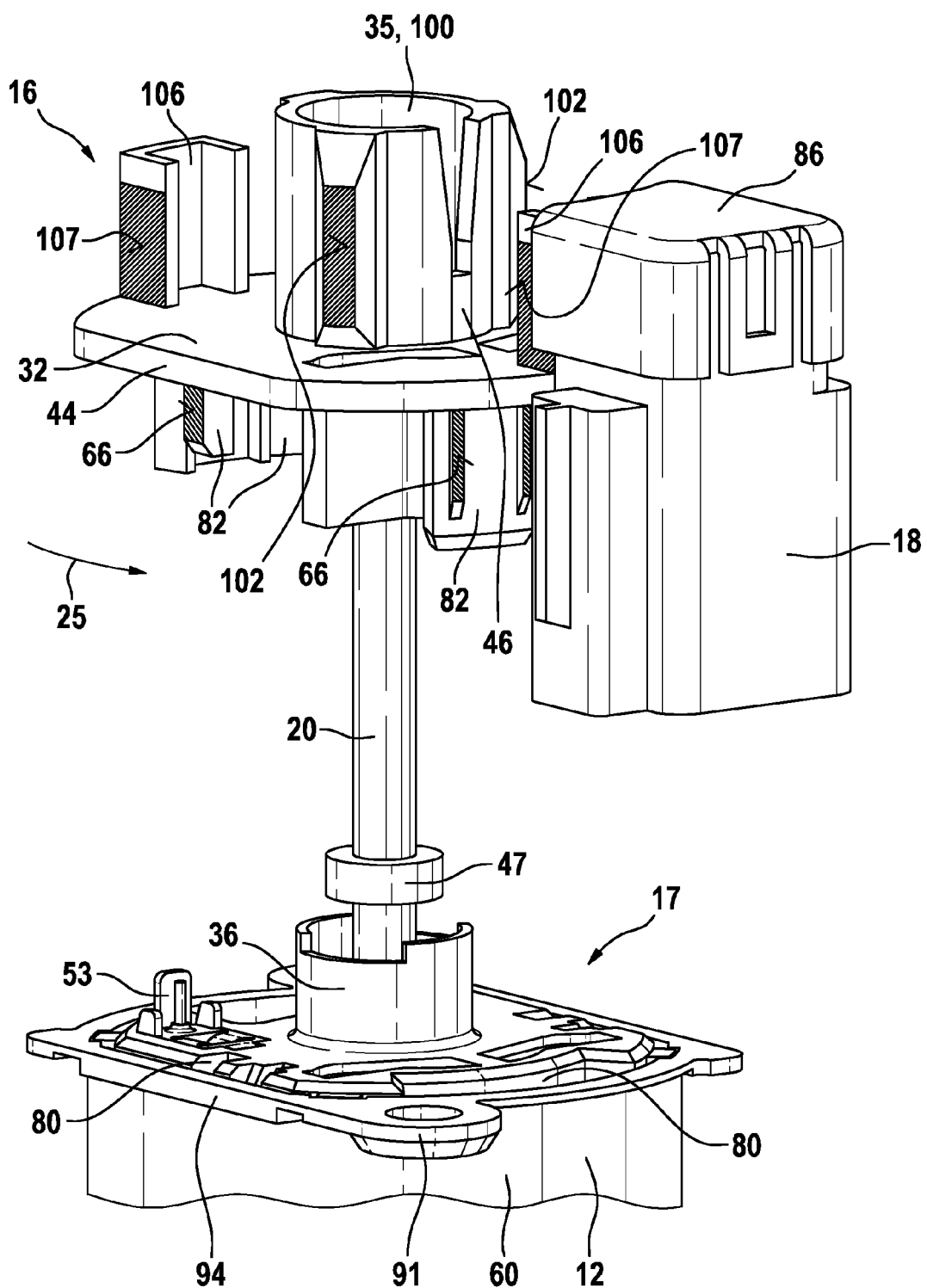
FIGS. 4 and 5 show two further exemplary embodiments with different plug modules.

FIG. 4 illustrates a further embodiment of a plug module 16 which, as an alternative to the embodiment of FIG. 3, can be mounted axially onto the brush holder component 17 in FIG. 2. The plug module 16 has, on the base plate 32 as encircling edge 44, only the radial outer side of the base plate 32 which, in turn, is part of the outer wall 45 of the electrical machine 10. Here, there are no axial seals 98 arranged on the encircling edge 44 since this plug module 16 is intended for use in a dry area. Therefore, the encircling wall 45 onto which the axial seals 98 are injection-molded according to FIG. 3 is also dispensed with here. In order to position the pole housing 12 precisely in relation to the gear mechanism housing 14, a centering dome 100 is formed around the circular wall 35 of the plug module 16, radial adjusting surfaces 102 which are radially supported against a corresponding centering dome receptacle 104 of the gear mechanism housing 14 being formed on said centering dome. As a result, the rotor shaft 20 is exactly radially centered in the gear mechanism housing 14 during axial mounting. Further adjusting pins 106 are integrally formed on the outer edge 44 of the plug module 16 in the axial direction 24, which further adjusting pins have adjusting surfaces 107 in the circumferential direction 25. After axial mounting, these tangential adjusting surfaces 107 bear against corresponding adjusting receptacles of the gear mechanism housing 14 in order to precisely align the rotary position of the plug module 16 in relation to the gear mechanism housing 14. The axial projections 82 toward the pole housing 12 are of identical design to those in the plug module 16 in FIG. 3, so that this plug module 16 is compatible with the identical brush carrier component 17—with the identical pole housing interface. Here, the interface between the pole housing 12 and the gear mechanism housing 14 is completely independent of the brush carrier component 17 which does not make contact with the gear mechanism housing 14 here. Therefore, the gear mechanism housing 14 is positioned in relation to the pole housing 12 solely by means of the axial projections 82 of the plug module 16 which, by way of their centering surfaces 66, bear against the inner side 77 of the pole housing 12. In this embodiment, the EMC shield 86 is arranged only over the connection plug 18. It forms a kind of cap for the connection plug 18 which is arranged radially entirely outside the pole housing 12. In an alternative embodiment, the EMC shield 86 extends approximately over the entire plug module 16. A ring magnet 47 is arranged on the rotor shaft 20 within (or above) the centering dome 100, which ring magnet, as signal transmitter, interacts with a magnet sensor 46 which is arranged on the plug module 16 radially opposite the ring magnet 47.

Figure 5:
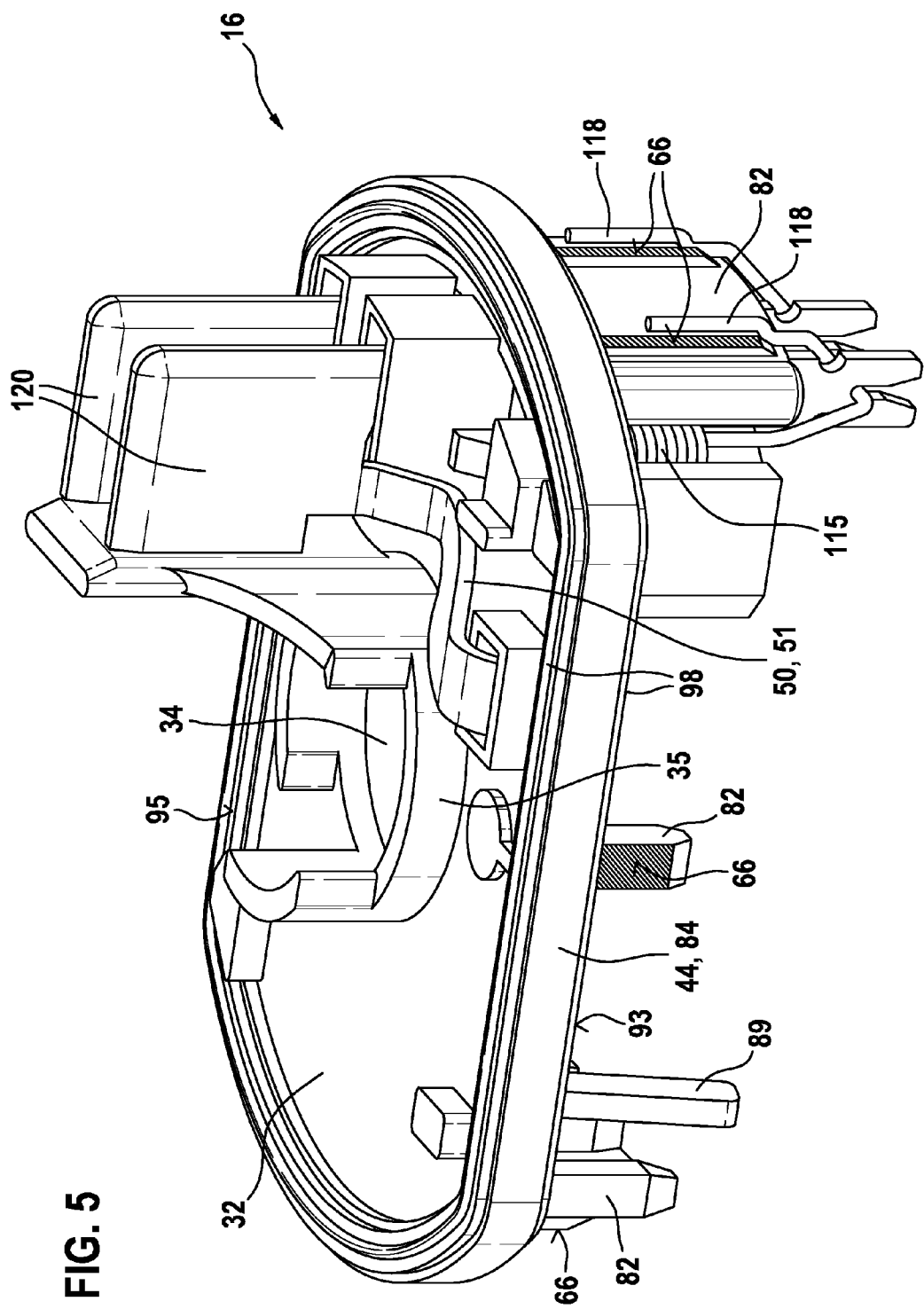

FIG. 5 illustrates a further embodiment of a plug module 16 which, as an alternative to the embodiment of FIG. 3 or FIG. 4, can be axially mounted on the brush holder component 17 in FIG. 2. The plug module 16 has, on the base plate 32 as encircling edge 44, the encircling wall 84 which is part of the outer wall 45 and on which the axial seals 98 toward the pole housing 12 and toward the gear mechanism housing 14 are arranged. In this embodiment, the plug module 16 does not have any outer connection plugs 18. Instead, internal axial plug-in contacts 120 are arranged on the base plate 32, which internal axial plug-in contacts, as electrical conductors 51, establish the connection to a connection plug 18 which is arranged on the gear mechanism housing 14. The plug-in contacts 120 are integrally formed with the conductors 51 as bent and stamped parts 50 which are inserted into the plug module 16. In this case, the plug-in contacts 120 protrude, as parallel contact plugs, axially into the gear mechanism housing 14 and are contacted there by fork-type contacts, not illustrated. The circular wall 35 around the central cutout 34 is axially raised in the region of the plug-in contacts 120, so that the plug-in contacts 120 can be radially supported against it. By way of example, an insert or plug-in electronics system which protrudes into the gear mechanism housing by way of an electronics printed circuit board is arranged on the gear mechanism housing 14. The outer connection plug 18 is then formed on the outer side of the insert electronics system for the purpose of making contact with a power source. The axial plug-in contacts 120 make contact with the electronics printed circuit board in the gear mechanism housing 14 and, by means of said electronics printed circuit board, with the outer connection pins 42 of the insert electronics system. Since the electrical conductors 51 are not routed out of the plug module 16 by means of a radial web, the encircling wall 84 is formed in a manner closed over the entire circumference, without radial outer projection. In this case, the geometry of the encircling wall 84 corresponds approximately to the shape of the flange 94 of the pole housing 12. Here, electronic components 115, for example interference-suppression elements 99, are arranged on that side of the base plate 32 which faces the pole housing 12. For the purpose of forming a ground contact with the pole housing 12, a free contact end 118 which, when it is pressed into the pole housing 12, makes electrical contact with the inner side 77 of said pole housing is arranged on the radial outer side of the axial projection 82.

As is clear from FIG. 2, axial holes 88 are formed radially inside the axial cutouts 80 in the brush carrier component 17, unlocking pins 89 which are integrally formed on the plug module 16 engaging axially into said axial holes during axial mounting of said plug module in order to unlock the brushes 26 from a mounting position so that they then bear radially against the commutator 55. Furthermore, interference-suppression chokes 99 which compensate for any voltage peaks which may occur on the brushes 26 are arranged in the brush carrier component 17 in the supply lines to the brushes 26. As an alternative to the electrical contact-connection of the brush holder component 17 to the plug module 16 by means of the connection wire 54 which is fastened in the electrical contact elements 52, a plug-in connection 53 can be formed in the plug module 16 and in the brush holder component 17, in the case of which plug-in connection the electrical contact is established, for example, by means of insulation-displacement connections or spring contacts directly when the plug module 16 is mounted onto the brush carrier component 17.

According to the invention, an identical brush carrier component 17 is always used for all variants for the purpose of realizing a modular motor system since the injection-molding die for this component is very complicated to produce. Accordingly, the interface of the brush carrier component 17 in relation to the pole housing 12 is likewise always of identical design, so that centering of the brush carrier component 17 by means of the centering surfaces 67 on the inner side 77 of the pole housing wall 60 always remains the same. In contrast, for example, the length of the pole housing 12 and of the rotor 15 can be varied in accordance with the required performance. Similarly, the plug module 16 is matched to the respective customer plug and to the corresponding electronics requirements. In one variant, the electrical machine 10 does not have a printed circuit board with electronics components, but rather all necessary electronic components are inserted directly into the plug module 16. For example, further interference-suppression and/or protective elements or different sensors can be installed in the plug module 16. In this case, an interference-suppression component can in particular also be arranged in the connection plug 18 radially outside the pole housing 12. As an alternative, the electrical contact-connection of the brushes 26 to the plug module 16 can be realized by means of plug-in contacts 53 in the case of which corresponding plug-in contacts of the plug module 16 and of the brush carrier component 17 engage axially one in the other—in particular with a spring action—directly when the plug module 16 is axially mounted.

It should be noted that the specific shape of the pole housing 12, of the gear mechanism housing 14 and of the plug module 16 illustrated the figures can be matched to the corresponding application of the electrical machine 10. Therefore, for example, the plug module 16 can receive different electronic components 115, such as interference-suppression elements 99 or sensors 46 or a thermal protection device, depending on requirements. In this case, a small sensor printed circuit board which interacts with a transmitter magnet 47 on the rotor shaft 20 can also be arranged on the plug module 16. Similarly, the configuration of the connection pins 42, 43 can be varied and can be, for example, encapsulated with the plug module 16 or can be clipped into said plug module. An additional EMC shield 86 can optionally be arranged on the plug module 16 or, for example, the plug cover can be provided with a metal shield. In an alternative embodiment, not illustrated, the plug collar 40 with the connection pins 42 can also extend in the radial direction 23 or the tangential direction 25 in relation to the rotor shaft 20. As an alternative, the plug module 16 can also be connected to the brush carrier component 17 by means of a plug-in connection, in particular by means of an insulation-displacement connection.

The invention claimed is:

1. An electrical machine (10), having a commutator (55) which is arranged on a rotor shaft (20) and is configured to be electrically conductively connected to a power source by electric brushes (26), wherein the brushes (26) are fastened to a brush carrier component (17) which is radially supported directly against an inner wall (77) of a pole housing (12), and having a plug module (16) which has electrical conductors (51) for connection to an outer connection plug (18), wherein the plug module (16) has axial projections (82) which engage into corresponding axial cutouts (80) in the brush carrier component (17), wherein the axial projections (82) are directly supported radially against the inner wall (77) of the pole housing (12) and not radially against the brush holder component (17), characterized in that the axial projections (82) are integrally formed on the base plate (32), wherein at least two axial projections (82) are arranged radially opposite the rotor shaft (20) and each have at least one centering surface (66) by way of which the plug module (16) is radially supported against the inner wall (77) of the pole housing (12).

2. The electrical machine (10) as claimed in claim 1, characterized in that the plug module (16) has a base plate (32) with an encircling edge (44) which bears axially against a flange (94) of the pole housing (12), wherein the base plate (32) has a central cutout (34) through which the rotor shaft (20) protrudes out of the pole housing (12).

3. The electrical machine (10) as claimed in claim 1, characterized in that at least two axial projections (82) have a radial outer side, which is curved in the shape of a circle, as the at least one centering surface (66), which radial outer sides of each of the at least two axial projections (82) bear against one corresponding circular section (75) of the inner wall (77) of the pole housing (12) in order to center the plug module (16).

4. The electrical machine (10) as claimed in claim 1, characterized in that the pole housing (12), on a flange (94), has a flattened circular cross section with two parallel opposite side faces (76) against which at least one axial projection (82) radially bears by way of the at least one centering surface (66).

5. The electrical machine (10) as claimed in claim 1, characterized in that a metal EMC shielding plate (86) is arranged axially between the gear mechanism housing (14) and the plug module (16), which metal EMC shielding plate substantially covers an entire surface area of the base plate (32), apart from a central aperture (34) for the rotor shaft (20).

6. The electrical machine (10) as claimed in claim 1, characterized in that a centering dome (100) is formed on the plug module (16), which centering dome encloses a central aperture (34) of the brush holder component (17) and the rotor shaft (20), wherein the centering dome (100) is axially inserted into a centering dome receptacle (104) of the gear mechanism housing (14) during assembly, and adjusting surfaces (107) in respect of a tangential direction (25) are integrally formed, which adjusting surfaces precisely align a rotary position of the plug module (16) with respect to the gear mechanism housing (14).

7. The electrical machine (10) as claimed in claim 1, characterized in that the plug module (16) has a base plate (32) with an encircling edge (44) which bears axially against a flange (94) of the pole housing (12), wherein the base plate (32) has a central cutout (34) through which the rotor shaft (20) protrudes out of the pole housing (12) and the outer connection plug (18) is connected to the base plate (32) by means of a radial web (30).

8. The electrical machine (10) as claimed in claim 1, characterized in that the plug module (16) is in the form of a plastic injection-molded part, wherein metal pins (42, 43) are arranged in the outer connection plug (18) and are injection-molded or inserted into the plug module (16), wherein the outer connection plug (18) is integrally produced with the plug module (16).

9. The electrical machine (10) as claimed in claim 1, characterized in that the axial cutouts (80) on the brush holder component (17) are formed on a radial circumferential contour (64) of said brush holder component, and are dimensioned to be of a size such that the axial cutouts do not make radial contact with the axial projections (82).

10. The electrical machine (10) as claimed in claim 1, characterized in that plug-in contacts (120) which extend axially into the gear mechanism housing (14) are inserted into the plug module (16), which plug-in contacts, as electrical conductors (51), connect the brushes (26) to a connection plug (18) which is arranged on the gear mechanism housing (14), wherein the connection plug (18) is formed on an outer side of an insert electronics system, the electronics printed circuit board of which insert electronics system is inserted into the gear mechanism housing (14).

11. The electrical machine (10) as claimed in claim 1, characterized in that a metal EMC shielding plate (86) is arranged axially between the gear mechanism housing (14) and the plug module (16), which metal EMC shielding plate substantially covers an entire surface area of the outer connection plug (18), apart from a central aperture (34) for the rotor shaft (20).

12. The electrical machine (10) as claimed in claim 1, characterized in that a centering dome (100) is formed on the plug module (16), which centering dome encloses a central aperture (34) of the brush holder component (17) and the rotor shaft (20), wherein the centering dome (100) is axially inserted into a centering dome receptacle (104) of the gear mechanism housing (14) during assembly, and adjusting surfaces (107) in respect of a tangential direction (25) are integrally formed on a circumferential edge (44), which adjusting surfaces precisely align a rotary position of the plug module (16) with respect to the gear mechanism housing (14).

13. The electrical machine (10) as claimed in claim 1, characterized in that radial positioning surfaces (67) are formed on a radial circumferential contour (64) of the brush holder component (17), which radial positioning surfaces center the brushes (26) in relation to the commutator (55), wherein the brushes (26) are formed as hammer-type brushes (27) which are fastened to the brush holder component (17) by spring arms.

14. The electrical machine (10) as claimed in claim 1, characterized in that a metal EMC shielding plate (86) is arranged axially between the gear mechanism housing (14) and the plug module (16), which metal EMC shielding plate substantially covers an entire surface area of the base plate (32) and of the outer connection plug (18), apart from a central aperture (34) for the rotor shaft (20).

15. An electrical machine (10), having a commutator (55) which is arranged on a rotor shaft (20) and is configured to be electrically conductively connected to a power source by electric brushes (26), wherein the brushes (26) are fastened to a brush carrier component (17) which is radially supported directly against an inner wall (77) of a pole housing (12), and having a plug module (16) which has electrical conductors (51) for connection to an outer connection plug (18), wherein the plug module (16) has axial projections (82) which engage into corresponding axial cutouts (80) in the brush carrier component (17), wherein the axial projections (82) are directly supported radially against the inner wall (77) of the pole housing (12) and not radially against the brush holder component (17), characterized in that the pole housing (12), on a flange (94), has a flattened circular cross section with two parallel opposite side faces (76) against which at least one axial projection (82) radially bears by way of a centering surface (66).

16. The electrical machine (10) as claimed in claim 15, characterized in that the plug module (16) has a base plate (32) with an encircling edge (44) which bears axially against the flange (94) of the pole housing (12), wherein the base plate (32) has a central cutout (34) through which the rotor shaft (20) protrudes out of the pole housing (12).

17. The electrical machine (10) as claimed in claim 15, characterized in that at least two axial projections (82) have a radial outer side, which is curved in the shape of a circle, as the centering surface (66), which radial outer sides of each of the at least two axial projections (82) bear against one corresponding circular section (75) of the inner wall (77) of the pole housing (12) in order to center the plug module (16).

18. The electrical machine (10) as claimed in claim 15, characterized in that, axially opposite the pole housing (12), a gear mechanism housing (14), by way of aflange (92), bears against the plug module (16), into which gear mechanism housing the rotor shaft (20) axially protrudes for torque transmission, wherein an encircling edge (44) of the plug module (16) is in the form of a circumferential wall (84) which is part of an outer housing (45) of the electrical machine (10).

19. The electrical machine (10) as claimed in claim 18, characterized in that at least one axial seal (98) is formed on the circumferential wall (84), which axial seal seals off the plug module (16) from the flange (94) of the pole housing (12) and/or from the flange (92) of the gear mechanism housing (14) with respect to dirt and water.

20. The electrical machine (10) as claimed in claim 15, characterized in that a centering dome (100) is formed on the plug module (16), which centering dome encloses a central aperture (34) of the brush holder component (17) and the rotor shaft (20), wherein the centering dome (100) is axially inserted into a centering dome receptacle (104) of the gear mechanism housing (14) during assembly, and adjusting surfaces (107) in respect of a tangential direction (25) are integrally formed, which adjusting surfaces precisely align a rotary position of the plug module (16) with respect to the gear mechanism housing (14).

21. An electrical machine (10), having a commutator (55) which is arranged on a rotor shaft (20) and is configured to be electrically conductively connected to a power source by electric brushes (26), wherein the brushes (26) are fastened to a brush carrier component (17) which is radially supported directly against an inner wall (77) of a pole housing (12), and having a plug module (16) which has electrical conductors (51) for connection to an outer connection plug (18), wherein the plug module (16) has axial projections (82) which engage into corresponding axial cutouts (80) in the brush carrier component (17), wherein the axial projections (82) are directly supported radially against the inner wall (77) of the pole housing (12) and not radially against the brush holder component (17), characterized in that a metal EMC shielding plate (86) is arranged axially between the gear mechanism housing (14) and the plug module (16), which metal EMC shielding plate substantially covers an entire surface area of the base plate (32), apart from a central aperture (34) for the rotor shaft (20).

22. The electrical machine (10) as claimed in claim 21, characterized in that the metal EMC shielding plate substantially covers an entire surface area of the outer connection plug (18), apart from the central aperture (34) for the rotor shaft (20).

23. The electrical machine (10) as claimed in claim 21, characterized in that axial stops (97) are formed on a flange (94) or on the inner wall (77) of the pole housing (12), the brush carrier component (17) being axially supported against said axial stops, wherein the plug module (16) is axially fastened by the brush carrier component (17) and prevents axial slipping of the brush carrier component (17).

24. The electrical machine (10) as claimed in claim 21, characterized in that radial positioning surfaces (67) are formed on a radial circumferential contour (64) of the brush holder component (17), which radial positioning surfaces center the brushes (26) in relation to the commutator (55), wherein the brushes (26) are formed as hammer-type brushes (27) which are fastened to the brush holder component (17) by spring arms.

* * * * *